United States Patent [19]

Murakami et al.

[11] Patent Number: 5,395,820
[45] Date of Patent: Mar. 7, 1995

[54] OXIDE SUPERCONDUCTOR AND PROCESS FOR PRODUCING THE SAME

[75] Inventors: Masato Murakami; Tsutomu Takata; Koji Yamaguchi; Akihiro Kondoh; Naoki Koshizuka, all of Tokyo, Japan

[73] Assignees: International Superconductivity Technology Center, Tokyo; Hokuriku Electric Power Company, Toyama; Sumitomo Electric Industries, Ltd., Osaka; Kawasaki Jukogyo Kabushiki Kaisha, Hyogo; Nippon Steel Corporation, Tokyo, all of Japan

[21] Appl. No.: 952,636
[22] PCT Filed: Apr. 1, 1992
[86] PCT No.: PCT/JP92/00402
§ 371 Date: Dec. 1, 1992
§ 102(e) Date: Dec. 1, 1992
[87] PCT Pub. No.: WO92/17407
PCT Pub. Date: Oct. 15, 1992

[30] Foreign Application Priority Data

Apr. 1, 1991 [JP] Japan .................... 3-68627

[51] Int. Cl.⁶ .............. H01B 12/00; H01L 39/12
[52] U.S. Cl. .................... 505/126; 505/780; 505/781; 505/785; 505/125; 505/450; 252/518; 252/521
[58] Field of Search .......... 505/1, 785, 780, 781; 252/518, 521

[56] References Cited

U.S. PATENT DOCUMENTS 5,084,436  1/1992  Murimoto .................... 505/785

FOREIGN PATENT DOCUMENTS

0493007A1  7/1992  European Pat. Off. .
64-28219   1/1989  Japan .
2-153803   6/1990  Japan .
9217407   10/1992  WIPO .

OTHER PUBLICATIONS

Saito "Crystal growth and properties of $R_2Ba_2CuPtO_8$ ..." *Jnl. of crystal growth vol. 109* Feb. 1991 pp. 426–431.
Yoshida "Effects of the platinum group element addition ..." *Physica C vol. 185–189* Dec. 1, 1991 pp. 2409–2410.
Morita "Effect of platinum addition on melt-processed ..." *Jap. Jnl. Appl. Phys. Pat 2*, vol. 30 (5A) May 1991 pp. L813–L815.
Izami "Reaction mechanism of ytrium-system superconductors ..." *J. Mater Res. vol. 7*(4) 1992 pp. 801–807.
Ogawa "Preparation of yttrium barium copper oxide ..." *Superscand Sc. Technol.* vol. 5(18) 1992 pp. 889–892.
H. Fujimoto et al., Proceedings of the 2nd International Symposium on Superconductivity (ISS '89), Nov. 14–17, 285–288 (1989).
J. Shimoyama et al., Japanese Journal of Applied Physics 29(11), L1999–L2001 91990) Nov.
T. Shishido et al., Journal of Crystal Growth 85, 599–601 (1987).
U. Geiser et al., Journal of Solid State Chemistry 73, 243–251 (1988).

*Primary Examiner*—Paul Lieberman
*Assistant Examiner*—M. Kopec
*Attorney, Agent, or Firm*—Wenderoth, Lind & Ponack

[57] ABSTRACT

An oxide superconductor comprising a crystal of $LnBa_2Cu_3O_y$ (wherein Ln is at least one of rare earth elements including Y) and, finely dispersed therein, $Ln_2BaCuO_5$ and a composite oxide of PtBaCuO having an average particle diameter of 0.1 to 10 μm is disclosed. The oxide superconductor is produced by melting a raw material powder comprising a composite oxide of Ln, Ba and Cu, rapidly solidifying the melt, pulverizing the resultant solid, mixing a Pt powder with the pulverized mixture, forming a resultant mixture, heating a resultant formed body to bring the formed body to a partially-molten state and cooling the partially-molten material.

6 Claims, 2 Drawing Sheets

OXIDE SUPERCONDUCTOR AND PROCESS FOR PRODUCING THE SAME

TECHNICAL FIELD

The present invention relates to a $LnBa_2Cu_3O_y$-based oxide superconductor having an excellent critical current density and stable mechanical properties and a process for producing the same.

In the present invention, Ln refers to Y, Sm, Eu, Gd, Dy, Ho, Er and Yb, and is hereinafter used in this meaning.

BACKGROUND ART

Since an oxide superconductor, such as a Y-based oxide superconductor, has a high critical temperature, liquid nitrogen rich in resources can be utilized without use of liquid helium or other substances having a high cost, so that there is a possibility that the range of application of the oxide superconductor can be greatly expanded.

In order for the oxide superconductor to be put to practical use, it is important to enhance the critical current density at a service temperature. In recent years, MPMG process (Melt-Powdering-Melt-Growth; see "Proceedings of ISS 89 Springer-Verlag", 1190, p. 285) (U.S. patent application Ser. No.07/606207) or other processes have enabled the oxide superconductor to be molded into a bulk form and, at the same time, a critical current density on a practical level to be attained. This has led to studies on the application of the oxide superconductor to bearings, flywheels, etc.

The MPMG process comprises melting, for example, a LnBaCuO-based raw material to form a mixed phase comprising an oxide of Ln and a liquid phase, rapidly cooling the mixed phase for solidification, pulverizing the resultant solid, forming a powder, heating the powder to bring it to a partially-molten material comprising $Ln_2BaCuO_5$ (hereinafter referred to as "211 phase") and a liquid phase and gradually cooling the partially-molten material under predetermined conditions. According to this process, the 211 phase, which is a LnBaCuO-based non-superconducting phase, can be dispersed in $LnBa_2Cu_3O_y$ (hereinafter referred to as "123 phase"). The presence of the 211 phase suppresses the movement of the magnetic flux, which enables a high critical current density to be attained even in a high magnetic field. Such a non-superconducting phase is called "pinning center of magnetic flux".

On the other hand, there is no need to limit the pinning center of magnetic flux to the 211 phase only, and there is a possibility that all heterogeneous portions act as the pinning center. However, when the heterogeneous portions deteriorate superconducting properties of a matrix or form a grain boundary or the like to prevent the flow of a superconducting current, the critical current density is unfavorably lowered. For this reason, the heterogeneous portions capable of functioning as an effective pinning center are limited. Further, it is necessary for the above-described pinning center to be finely and homogeneously dispersed.

In recent years, it has been centered out that $BsSnO_3$ does not deteriorate the properties of the matrix and is finely dispersed within a crystal to effectively function as a pinning center (see "Japanese Journal of Applied Physics", vol. 29, 1990. 1999).

Under the above-described current circumstances, an object of the present invention is to provide an oxide superconductor having a higher critical current density by virtue of a finer dispersion of the pinning center obtained in the prior art and a-production process that can stably provide the superconductor.

CONSTRUCTION OF THE INVENTION

The present inventors have conducted studies with a view to attaining the above-described object and, as a result, have found that when the number of types of the pinning center of the magnetic flux is only one, as in the prior art, even though the content is increased to enhance the effect, the pinning center aggregates and coarsens and consequently lowers the effect and a remarkable improvement in the critical current density can be attained by very finely dispersing a platinum compound in the 123 phase together with the 211 phase to form two types of pinning centers.

$Ln_2Ba_2CuPtO_6$ (see T. Shishido et al., Journal of Crystal Growth, vol. 85, 599–601 (1987)), $Ln_2Ba_3Cu_2PtO_{10}$ (see U. Geiser et al. J. Solid State Chem. vol. 73 (1988) p. 243) and other oxides have hitherto been reported as an oxide formed as a result of a reaction of the 123 phase with Pt. Since, however, all of these oxides are liable to aggregate and coarsen, fine dispersion thereof has been considered difficult.

However, studies conducted by the present inventors have revealed that when an oxide superconductor is produced by the above-described MPMG process, the addition of a platinum powder to a LnBaCuO-based raw material enables the platinum compound to be finely and homogeneously dispersed in the form of a particle having an average particle diameter of about 0.1 to 10 μm.

Specifically, the MPMG process involves a step wherein the above-described raw material is heated for melting (a mixed phase comprising an oxide of Ln and a liquid phase), solidified and pulverized. The melted and solidified material contains a metastable $BaCu_2O_3$. This phase decomposes through the following reaction with oxygen in the air.

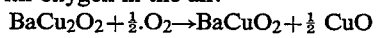

$BaCu_2O_2 + \frac{1}{2}O_2 \rightarrow BaCuO_2 + \frac{1}{2} CuO$

The pulverized powder is further refined on a molecular level, which promotes homogeneous dispersion.

As a result, a platinum compound formed through a reaction with $BaCuO_2$ and $CuO$ is easily refined and homogeneously dispersed. The fine dispersion of such a platinum Compound has been attained for the first time by using the MPMG process.

The present invention has been made based on the above-described results of studies, and the subject matter of the present invention is as follows. Specifically, the present invention consists in melting a raw material powder for a Ln—Ba—Cu—O—based oxide superconductor to form a mixed phase (comprising an oxide of Ln and a liquid phase), rapidly cooling the mixed phase for solidification, pulverizing the resultant solid, mixing the pulverized powder with a platinum powder, forming the mixture, heating a resultant formed body to bring it to a partially-molten state (a mixed phase comprising a 211 phase and a liquid phase) and cooling at a predetermined rate.

In the superconductor of 123 phase type thus produced, the 211 phase and platinum compound are finely dispersed in a crystal of the 123 phase to synergistically improve the pinning effect of the magnetic flux.

BRIEF DESCRIPTION OF THE INVENTION

FIG. 1 (B) is an electron photomicrograph at a magnification of 1000 of the metallic structure shown in FIG. 1 (A)

BEST MODE FOR CARRYING OUT THE INVENTION

The best mode for carrying out the invention will now be described in detail.

Figure 1A:
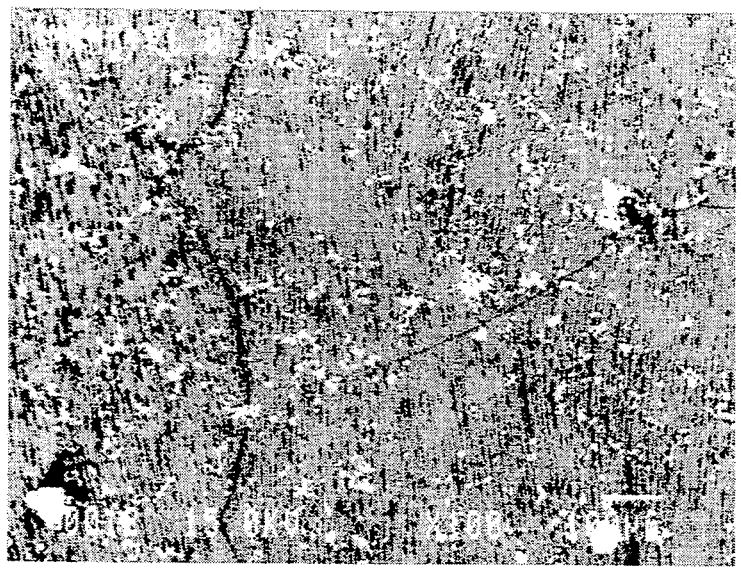
FIG. 1 (A) is an electron photomicrograph at a magnification 100 of a metallic structure of the oxide superconductor according to the present invention.
Figure 1B:
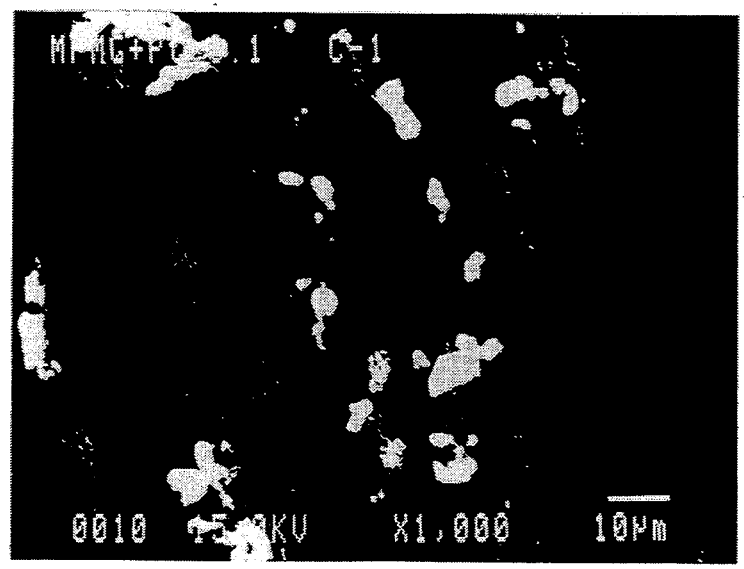

The structure of the superconductor according to the present invention is shown in FIGS. 1 (A) and (B).

A $Y_2BaCuO_5$ phase, which is a 211 phase, is dispersed in the form of a fine grain in an oxide superconductor comprising a $YBa_2Cu_3O_y$ phase which is a 123 phase and, at the same time, a platinum compound (a white portion in the photograph) is substantially homogeneously dispersed in the form of fine particles having an average particle diameter in the range of from 0.1 to 10 μm. These form a fine heterogeneous portion in the $YBa_2Cu_3O_y$ phase, which contributes to a remarkable improvement in the pinning effect of the magnetic flux.

The analysis of the platinum compound by means of an electron beam microanalyzer has revealed that the platinum compound has a composition of $Pt_1Ba_{4.2-4.5}Cu_{2.2-2.4}O_y$, that is, a composition of $PtBa_4Cu_2O_y$.

In the production of such a superconductor, a raw material for a Ln—Ba—Cu—O—based oxide superconductor material, that is, a powder of a mixture of $Ln_2O_3$ with $BaCO_3$ and CuO, is heat-melted at a temperature in the range of from 1200° to 1450° C. to form a mixed phase comprising $Ln_2O_3$ and a liquid phase, the mixed phase is cooled at a cooling rate of 100° to 2000° C./hr to conduct solidification and pulverized to form a powder having an average particle diameter of 0.1 to 10 μm, and a Pt powder having an average particle diameter in the range of from 0.1 to 10 μm is added in an amount of 0.2 to 2.0% by weight. This enables a precursor to the 211 phase to be homogeneously mixed with a platinum powder.

Thereafter, the mixed powder is compression-molded into a bulk forme having a desired shape. Then, a resultant formed body is brought to a partially-molten state (a mixed phase comprising a 211 phase and a liquid phase) at a temperature of 1050° to 1200° C. and gradually cooled from a temperature around 1000° C. at a cooling rate of 0.5° to 10° C./hr.

Thus, it is possible to produce a superconductor comprising a matrix which disperses the above-described platinum compound together with a 211 phase.

The Y—Ba—Cu—O—based superconductor exhibited a high critical current density of 15,000 to 35,000 $A/cm^2$ in a magnetic field of 77K, 1 T (tesla).

EXAMPLES

Example 1

$Y_2O_3$, $BaCO_3$ and CuO were mixed with each other in a Y: Ba: Cu ratio of 1.2:2.1:3.1, and the mixture was calcined in the air at 900° C. for 24 hrs. Thereafter, the calcined powder was melted at 1400° C. for 20 min, cooled to room temperature and then subjected to a pulverization-mixing treatment. At this stage, a platinum powder was added in an amount of 1% by weight.

The mixed powder was molded into a pellet having a diameter of 2 cm and a thickness of 0.5 cm, reheated at 1100° C. for 20 min, cooled to 1000° C. in one hour, gradually cooled (cooled in furnace) to 900° C. at a rate of 1° C./hr, further heated to 600° C. in one hour in an oxygen stream having a pressure of one atom and then cooled in a furnace to provide a superconductor.

Electron photomicrographs respectively at magnifications of 100 and 1000 of this superconductor are shown in FIGS. 1 (A) and (B). Compositions of five arbitrary places (A, B, C, D and E) of the platinum compound, that is, PtBaCuO, shown in FIG. 1 (B) were analyzed by means of an electron beam microanalyzer and, as a result, have found that, as shown in Table 1, the above-described structure comprises $PtBa_4Cu_2O_y$.

TABLE 1

| | | wt. % | Atom | Composition |
|---|---|---|---|---|
| A | Y | 0.000 | 0.0000 | $Pt_1Ba_{4.4}Cu_{2.3}O_y$ |
| | Ba | 52.132 | 31.4720 | |
| | Cu | 12.495 | 16.2825 | |
| | O | 9.706 | 45.0639 | |
| | Pt | 16.918 | 7.1618 | |
| | Total | 90.312 | 100.0000 | |
| B | Y | 0.000 | 0.0000 | $Pt_1Ba_{4.3}Cu_{2.3}O_y$ |
| | Ba | 52.448 | 30.0037 | |
| | Cu | 12.917 | 15.9697 | |
| | O | 9.586 | 47.0790 | |
| | Pt | 17.252 | 6.9476 | |
| | Total | 92.205 | 100.0000 | |
| C | Y | 0.000 | 0.0000 | $Pt_1Ba_{4.4}Cu_{2.4}O_y$ |
| | Ba | 52.264 | 30.7253 | |
| | Cu | 13.176 | 16.7404 | |
| | O | 9.040 | 45.6197 | |
| | Pt | 16.706 | 6.9140 | |
| | Total | 91.186 | 100.0000 | |
| D | Y | 0.000 | 0.0000 | $Pt_1Ba_{4.2}Cu_{2.2}O_y$ |
| | Ba | 51.807 | 29.6861 | |
| | Cu | 12.782 | 15.8289 | |
| | O | 9.635 | 47.3895 | |
| | Pt | 17.590 | 7.0954 | |
| | Total | 91.814 | 100.0000 | |
| E | Y | 0.000 | 0.0000 | $Pt_1Ba_{4.5}Cu_{2.4}O_y$ |
| | Ba | 51.876 | 31.1278 | |
| | Cu | 12.811 | 16.6134 | |
| | O | 8.809 | 45.3714 | |
| | Pt | 16.305 | 6.8874 | |
| | Total | 99.802 | 100.0000 | |

For comparison, a material to which no platinum had been added was subjected to the same treatment as that described above to provide a superconductor.

The critical current density of the superconductor produced by the above-described process was measured in a magnetic field of 77K, 1 T and found to be as high as 20000 $A/cm^2$.

On the other hand, the critical current density of the material, to which no platinum had been added, was as low as 8000 $A/cm^2$ under the same measurement conditions as described above.

Example 2

Figure 2:
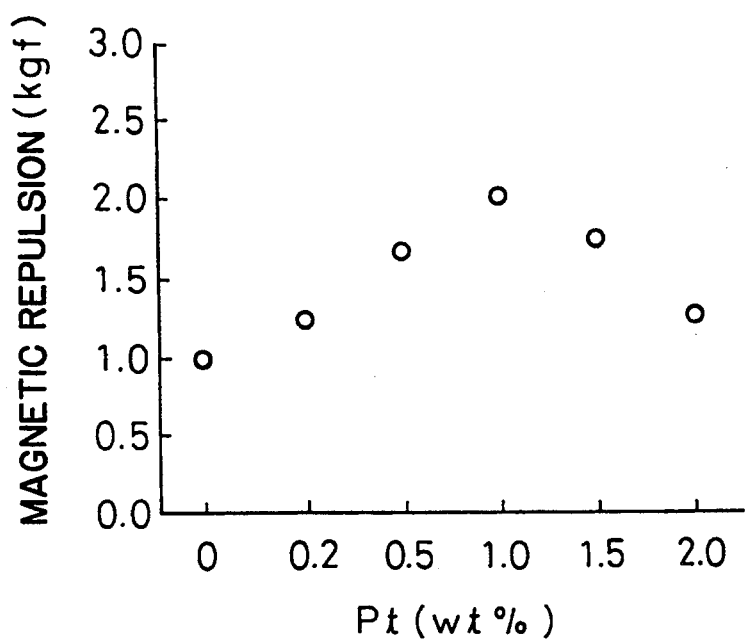
FIG. 2 is a diagram showing the relationship between the amount of addition of platinum and the magnetic repulsion in an oxide superconductor produced by the MPMG process.

A pulverized and mixed powder was produced in the same manner as that of Example 1. A platinum powder was added thereto in an amount in the range of from 0 to 2% by weight. Thereafter, the mixture was formed into a pellet having a diameter of 2 cm and a height of 0.5 cm, and the pellet was treated in the same manner as that of Example 1. The magnetic repulsion of the pellet at a height of 1 mm was measured using a magnet having a diameter of 2.5 cm, a thickness of 2 cm and a surface magnetic field of 4000 G (gauss) while cooling the pellet with liquid nitrogen. As a result, as shown in FIG. 2, the magnetic repulsion improved with the addition of platinum and reached the peak value when the amount of addition of platinum was 1%. However, when the amount of addition exceeded 2%, no significant effect was observed.

Example 3

Superconductors were produced in the same manner as that of Example 1, except that $HO_2O_3$, $Dy_2O_3$, $Eu_2O_3$, $Sm_2O_3$ and $Yb_2O_3$ were used instead of $Y_2O_3$. These superconductors were subjected to a measurement of critical current density in the same manner as that of Example 1. The results are given in Example 2. As is apparent from Table 2, all the superconductors exhibited a significant effect.

TABLE 2

| Sample | Critical current density (A/cm$^2$) |
| --- | --- |
| YBaCuO | 20000 |
| HoBaCuO | 18000 |
| DyBaCuO | 17500 |
| EuBaCuO | 16000 |
| SmBaCuO | 16500 |
| YbBaCuO | 16000 |
| *YBaCuO | 10000 |

Note) *: No platinum was added.

Example 4

A material having a composition of $Y_{1.5}Ba_{2.25}Cu_{3.25}O_7$ was heated at 1400° C. for 20 min, poured on a steel plate to cool the heated material and pulverized by means of a ball mill to an average particle diameter of about 5 μm. A $PtO_2$ powder was added thereto in an amount of 5% by weight, and the mixture was kneaded in an automated mortar for about one hour. A material, to which no platinum powder had been added, was used as a comparative material. These powders were formed into pellets having a diameter of 2 cm and a height of 2 mm, and the pellets were heated at 1100° C. for 20 min and cooled to 1000° C. in about one hour. Thereafter, the material was gradually cooled to 850° C. at a rate of 1° C./hr and removed and cooled at room temperature.

Finally, the cooled material was subjected to a heat treatment in an oxygen atmosphere having a pressure of one atom at 400° C. for 125 hrs. A rod sample having a length of 1.5 cm and a section having a size of 1×1 mm$^2$ was cut out of the treated pellet. At this time, the ab direction of the crystal was made parallel to the major axis.

A current was transmitted by an energization method along the major axis of the sample, that is, in the ab direction of the crystal to measure the critical current density. As a result, the critical current density as measured under conditions of 77K, 1 T (the magnetic field being parallel to the c axis of the crystal) was 35000 A/cm$^2$ for the material to which platinum had been added and 15000 A/cm$^2$ to which no platinum was added.

The platinum compound in the material, to which platinum has been added, had an average particle diameter of about 1 μm and was homogeneously dispersed almost over the entire region.

INDUSTRIAL APPLICABILITY

As described above, according to the present invention, an oxide superconductor having a high critical current density can be stably produced and, at the same time, a bulk material having a desired shape can be formed, which enables the oxide superconductor to be applied to various fields and, particularly, practical use of the oxide superconductor in bearings, flywheels, etc., to become possible.

We claim:

1. An oxide superconductor comprising a crystal of $LnBa_2Cu_3O_y$ wherein Ln is at least one element selected from the group consisting of Y, Sm, Eu, Gd, Dy, Ho, Er and Yb as an oxide superconducting phase and, finely dispersed therein, $Ln_2BaCuO_5$ as a 211 phase and $PtBa_4Cu_2O_y$ as a composite oxide of Pt, Ba and Cu having an average particle diameter of 0.1 to 10 μm.

2. A process for producing an oxide superconductor, which comprises mixing at least an oxide of one element selected from the group consisting of Y, Sm, Eu, Gd, Dy, Ho, Er and Yb, hereinafter referred to as "Ln", with a powder of $BaCO_3$ and CuO to prepare a mixed powder, heating the mixed powder, and melting the mixed powder to form a molten material, rapidly cooling and solidifying the molten material to form a solidified material, pulverizing the solidified material to form a fine powder, mixing 0.2 to 2.0% by weight of a platinum powder with the pulverized fine powder, forming a body with the resultant mixture, heating the formed body to bring it to a partially-molten state and then cooling the partially-molten formed body to finely disperse $Ln_2BaCuO_5$ as a 211 phase and a platinum compound of the formula $PtBa_4Cu_2O_y$ in a crystal of an oxide superconductor comprising $LnBa_2Cu_3O_y$, where y is a number sufficient to permit oxide superconductivity.

3. The process according to claim 2, wherein the platinum compound is a composite oxide of Pt, Ba and Cu having an average particle diameter of 0.1 to 10 μm.

4. The process according to claim 2, wherein the average particle diameter of the pulverized fine powder after rapid solidification is 0.1 to 10 μm.

5. The process according to claim 2, wherein, after the formed body is brought to a partially-molten state, it is cooled at a rate of 0.5 to 10° C./hr.

6. A process for producing an oxide superconductor, characterized by heating a mixed powder comprised of a composite oxide of Y, Ba and Cu to a temperature in the range of from 1300° to 1450° C. to form a mixed phase comprising $Y_2O_3$ and a liquid phase, rapidly cooling the mixed phase to form a solidified material, pulverizing the solidified material to provide a powder having an average particle diameter of 0.1 to 10 μm, adding and mixing said powder with a platinum powder in an amount of 0.2 to 2.0% by weight, forming the mixture into a formed body, heating the formed body to a temperature in the range of from 1050° to 1200° C. to bring the formed body to a partially-molten state, thereby forming a mixed phase comprising a 211 phase and a liquid phase, and cooling said formed body at a rate of 0.5 to 10° C./hr to disperse the 211 phase and a platinum compound of the formula $PtBa_4Cu_2O_4$ in a crystal of $LnBa_2Cu_3O_y$.

* * * * *